US006574993B2

(12) United States Patent
de Fouw et al.

(10) Patent No.: US 6,574,993 B2
(45) Date of Patent: Jun. 10, 2003

(54) METHOD OF MANUFACTURING A PREFORM EXHIBITING A PRECISELY DEFINED REFRACTIVE INDEX PROFILE BY MEANS OF A CHEMICAL VAPOR DEPOSITION (CVD) TECHNIQUE

(75) Inventors: Marinus Jacob de Fouw, Eindhoven (NL); Antonius Henricus Elisabeth Breuls, Urmond (NL)

(73) Assignee: Plasma Optical Fibre B.V., Eindhoven (NL)

( * ) Notice: Subject to any disclaimer, the term of this patent is extended or adjusted under 35 U.S.C. 154(b) by 4 days.

(21) Appl. No.: 09/747,363

(22) Filed: Dec. 20, 2000

(65) Prior Publication Data

US 2002/0076493 A1 Jun. 20, 2002

(30) Foreign Application Priority Data

Dec. 23, 1999 (NL) .............................. 1013944

(51) Int. Cl.$^7$ .............................. C23C 16/52
(52) U.S. Cl. .............................. 65/377; 65/378; 65/417; 427/8; 427/163.2; 427/166; 427/237; 427/255.13; 427/255.18; 427/255.19
(58) Field of Search .......................... 65/377, 378, 417; 427/8, 163.2, 166, 237, 255.13, 255.18, 255.19

(56) References Cited

U.S. PATENT DOCUMENTS

| 4,161,656 A |   | 7/1979  | Marcuse et al. ............. 250/459 |
| 4,181,433 A | * | 1/1980  | Marcuse ..................... 356/128 |
| 4,217,027 A | * | 8/1980  | MacChesney et al. ...... 385/123 |
| 4,292,341 A | * | 9/1981  | Marcuse et al. .............. 427/10 |
| 4,362,943 A | * | 12/1982 | Presby ..................... 250/459.1 |
| 4,889,404 A | * | 12/1989 | Bhagavatula et al. .......... 307/3 |

FOREIGN PATENT DOCUMENTS

| DE | 3834011  | 4/1990 |
| JP | 57042552 | 3/1982 |

* cited by examiner

Primary Examiner—Timothy Meeks
(74) Attorney, Agent, or Firm—Seed IP Law Group PLLC

(57) ABSTRACT

The present invention relates to a method of applying glass layers, which may or may not be doped, to the interior of a substrate tube by means of a chemical vapor deposition (CVD) technique, using a reactive gas mixture, in order to obtain a preform that exhibits a precisely defined refractive index profile, which method comprises a number of steps.

10 Claims, No Drawings

METHOD OF MANUFACTURING A PREFORM EXHIBITING A PRECISELY DEFINED REFRACTIVE INDEX PROFILE BY MEANS OF A CHEMICAL VAPOR DEPOSITION (CVD) TECHNIQUE

BACKGROUND OF THE INVENTION

1. Field of the Invention

The present invention relates to a method of applying glass layers, which may or may not be doped, to the interior of a substrate tube by means of a chemical vapour deposition (CVD) technique, using a reactive gas mixture, in order to obtain a preform that exhibits a precisely defined refractive index profile.

2. Description of the Related Art

A method of this kind is known per se from U.S. Pat. No. 4,292,341. According to said US patent, efficient transmission of optical wave energy along an optical fiber is achieved by grading the refractive index of the fiber core. Thus, accurate knowledge of the index profile is necessary in order to assess a fiber's transmission properties. To this end, various techniques have been developed for measuring the index profile of optical fibers and optical fiber preforms. According to the method known from the aforesaid US patent, a precursor, in the form of a gas containing glass forming material and suitable index modifying dopants, is caused to flow into a substrate tube. The substrate tube is then heated, causing a layer of glass to be deposited on the inner surface of the tube. Thus the thickness of each deposited layer, and the concentration of dopants within each layer can be considered to be functions of a number of parameters including the temperature of the hot zone created within the tube, the speed with which the hot zone moves along the tube, and the concentrations of the glass forming material and the index modifying dopants within the gas being fed to be tube. Thus the exact concentrations in the gaseous mixture being fed to the substrate tube are accurately measured and carefully checked during manufacture of the preform. To this end the gaseous components, for example $GeCl_4$ and $SiCl_4$, are illuminated with ultraviolet radiation, after which the intensity of the radiation energy from said gaseous material is measured, which measurement is compared with a reference signal, whereby a control signal is generated in response to this comparison, which control signal causes the concentration of $GeCl_4$ and/or $SiCl_4$ in the gaseous material to change. Such a change will only take place until the difference between the reference signal and the control signal has reached value zero. When using such a method, it will be possible to manufacture a preform exhibiting a precisely computed refractive index profile. One drawback of a technique of this kind is the fact that in practice the measurements whereby ultraviolet radiation is used are not accurate and reproducible to a sufficient degree, so that a preform is obtained which exhibits an unacceptable variation in comparison with the desired refractive index profile of the preform to be manufactured. In addition, such a method is only suitable for supplying one dopant, because generally two or more dopants cannot be distinguished from each other to a sufficient degree and because they produce interference upon being illuminated with ultraviolet radiation.

A method of this kind is also known from U.S. Pat. No. 4,161,656, wherein the concentration and distribution of index-modifying dopants is determined by illuminating a length of the fiber or fiber preform with ultraviolet radiation. A drawback that occurs thereby is that such a measurement does not meet the requirements that are currently made with regard to accuracy. In addition to that, exact feedback between the process conditions during deposition and the measured values is difficult to realize in practice, so that the profile that is eventually obtained exhibits differences with the intended profile.

BRIEF SUMMARY OF THE INVENTION

In one embodiment, a method of applying glass layers, which may or may not be doped, to the interior of a substrate tube by means of a chemical vapour deposition (CVD) technique, using a reactive gas mixture, in order to obtain a preform that exhibits a precisely defined refractive index profile, includes but is not limited to: a) determining the desired refractive index profile of the preform to be manufactured, b)precisely adjusting both the composition and the supply rate of the reactive gas mixture for manufacturing the intended preform, in conformity with the refractive index profile determined in step a), c) introducing the reactive gas mixture, under the conditions adjusted in step b), into the substrate tube and effecting a reaction therein so as to achieve deposition of the glass-forming oxides onto the interior of the substrate tube, d)collapsing the substrate tube obtained from the deposition process of step c) into a preform and subsequently subjecting said preform to a refractive index profile measurement, e) comparing the refractive index profile determined in step a) with the refractive index profile measured in step d), and f) correcting the differences in refractive index profiles measured in step e) by adapting the composition of the reactive gas mixture as a function of time during the subsequent deposition process.

DETAILED DESCRIPTION OF THE INVENTION

Accordingly, an embodiment of the present invention provides a method of manufacturing a preform exhibiting a precisely defined refractive index profile by means of a chemical vapour deposition (CVD) technique.

Another embodiment of the present invention provides a method of manufacturing a preform by means of a chemical vapour deposition (CVD) technique wherein two or more dopants can be used for increasing or decreasing the refractive index value in a continuous deposition process.

Another embodiment of the present invention provides a method of manufacturing a preform by means of a chemical vapour deposition (CVD) technique wherein a preform exhibiting any desired refractive index profile can be obtained in a reproducible manner.

According to an embodiment of the present invention, the method referred to in the introduction is characterized in that said method comprises the following steps:

a) determining the desired refractive index profile of the preform to be manufactured, b) precisely adjusting both the composition and the supply rate of the reactive gas mixture for manufacturing the intended preform, in conformity with the refractive index profile determined in step a), c) introducing the reactive gas mixture, under the conditions adjusted in step b), into the substrate tube and effecting a reaction therein so as to achieve deposition of the glass-forming oxides onto the interior of the substrate tube, d) collapsing the substrate tube obtained from the deposition process of step c) into a preform and subsequently subjecting said preform to a refractive index profile measurement, e) comparing the refractive index profile determined in step a) with the refractive index profile measured in step d), and f) correcting the differences in refractive index profiles measured in step e) by adapting the composition of the reactive gas mixture as a function of time during the subsequent deposition process.

Using the aforesaid steps a)–f), it is possible to obtain precisely defined refractive index profiles in a preform whereby there is feedback of the refractive index profile measurement in the final preform and the gas dosage used in the deposition process. The results of the refractive index profile measurement obtained in step d) are used for adjusting the production process that takes place in step c) for manufacturing the preform. On the basis of the refractive index profile measurement obtained in step d) it is thus possible according to the present invention to determine the extent to which the process, in particular the composition of the reactive gas mixture, is to be adjusted in order to approach the refractive index profile desired in step a) as best as possible. After both the composition and the supply rate have been precisely adjusted according to step b) of the present invention, the deposition process according to step c) is carried out. Once the deposition process according to step c) has been terminated, the preform thus obtained is subjected to a refractive index profile measurement in step d). The refractive index profile measured in step d) is then compared with the refractive index profile determined in step a), after which a correction of the differences in the refractive index profiles measured in step e) may take place in step f) by adapting the composition of the reactive gas mixture thereto as a function of time during the subsequent deposition process. It should be understood that the correction carried out in step f) may require that the composition of the reactive gas mixture be adapted continuously during the subsequent deposition process. If the differences in refractive index profiles that are measured in step e) are acceptable within specific tolerances, however, no correction of the composition of the reactive gas mixture will take place during the subsequent deposition process, however. Correction will only take place when the differences measured in step e) exceed a specific tolerance range.

Since it has become apparent that the dopants provided in step c) are capable of diffusing from the inner layer of the substrate tube during collapsing of the substrate tube into a preform or a massive bar, the refractive, index profile is measured after collapsing in the present invention, so that adjustments may be made in connection with this phenomenon.

A suitable method for determining the refractive index profile preferably employs a laser source, which scans the preform perpendicularly to the longitudinal axis thereof. As a result of the geometry and the refractive index pattern in the preform, the laser beam is deflected. The deflected laser beam is measured and processed into a refractive index profile of the preform. A suitable instrument for determining the refractive index profile is the Preform Analyzer, of GN nettest, U.S.A.

According to a special embodiment of the present invention, it is preferable to maintain the overall volumetric deposition rate of the glass-forming oxides onto the interior of the substrate tube at a substantially constant level during the deposition process. The term "overall volumetric deposition rate" is understood to mean the deposition rate both of the glass-forming oxides and of the gaseous precursors or dopants for increasing or decreasing the refractive index values. A silica glass tube is preferred as a suitable substrate tube.

The use of a constant overall volumetric deposition rate during the deposition of the glass-forming oxides, possibly supplemented with one or more dopants, onto the interior of the substrate tube is in particular advantageous since the point in time at which a layer is deposited onto the interior of the substrate tube, which point in time corresponds to a specific radial position in the preform, is exactly fixed in such a situation. After all, once it is exactly known how much volume per unit time is built in, it is in principle possible to establish a correct relation between the radial position in the preform and the time at which the deposition of the glass-forming layers of oxide, possibly supplemented with one or more dopants, takes place with a gradually changing refractive index. Thus it is precisely known at what point in time correction according to step f) is desirable.

With preforms exhibiting complex refractive index profiles it is preferable to maintain the overall volumetric deposition rate of the glass-forming oxides onto the interior of the substrate tube, at a substantially constant level within a specific refractive index profile range during the deposition process. After all, with such complex profiles different ranges can be distinguished, for which different deposition conditions can be selected, which conditions are constant for each individual range, however.

The reactive gas mixture used in the present invention preferably comprises $SiCl_4$ and $O_2$, which reactive gas mixture may or may not contain one or more gaseous precursors or dopants for increasing or decreasing the refractive index value in comparison with the $SiO_2$ formed from $SiCl_4$ and $O_2$.

One or more compounds selected from the group consisting of $P_2O_5$, $TiO_2$, $ZrO_2$, $SnO_2$, $GeO_2$, N, $Al_2O_3$ are used as a suitable gaseous precursor or dopant for increasing the refractive index value.

The use of such compounds or dopants is in particular advantageous in view of the possibility of exact dosage thereof, so that it is possible to obtain any desired refractive index profile.

According to the present invention it is preferable to use one or more compounds selected from the group consisting of $B_2O_3$ and F for decreasing the refractive index value during the deposition process.

The method according to the present invention is in particular suitable for the deposition of glass-forming oxides, wherein step c) is carried out while using an internal plasma or an external heat source.

The present invention can in particular be used for manufacturing preforms exhibiting a refractive index profile that changes gradually as a function of the radius of the preform. Since the composition of the reactive mixture can be varied at any time during the deposition process, it is possible to obtain a gradually changing refractive index profile, which profile precisely conforms to the intended profile.

In order to enhance the accuracy of the refractive index profile measurement as carried out in step d), it is furthermore preferable to measure the preform obtained in step c) at a number of different longitudinal positions, possibly at a number of different angles, and to subsequently average the values thus obtained.

In order to enhance the accuracy of the production process, it is furthermore preferable to average the refractive index profile measurement on the basis of the results of two or more separately manufactured preforms.

EXAMPLE

A desired refractive index profile was determined for manufacturing a multi-mode preform. On the basis of said desired refractive index profile, the gases $SiCl_4$, $GeCl_4$, $C_2F_6$ and $O_2$ were introduced into a quartz glass tube. Inside the tube a plasma was formed, whilst the tube was maintained at a temperature of more than 800° C. by means of an oven. The supply of $SiCl_4$ and $GeCl_4$ was carried out during the course of time, whereas the supply of $C_2F_6$ was held constantly. The varying of the gases $SiCl_4$ and $GeCl_4$ was carried out in such a manner that the same volume of glass per unit time was deposited onto the interior of the quartz glass tube, whereby a refractive index profile as determined before was to be obtained. Once the layers of glass had been deposited onto the interior of the quartz glass tube, the tube thus formed was transformed into a massive bar by contraction or collapsing in an additional process step, after which measuring of the preform thus obtained took place in a so-called preform analyzer. Then refractive index profile as previously determined was compared with the refractive index profile as finally measured from the obtained preform. The form of the profile is indicated by profile parameter $\alpha$, whereby the composition of the reactive gas mixture will be adapted thereto as a function of time during the subsequent deposition process if it becomes apparent that the profile parameter $\alpha$ deviates from the desired value by more than 0.03. With a view to enhancing the accuracy, a number of preforms were used for determining the deviation of the profile parameter $\alpha$. Thus it has become apparent that according to the method of the present invention the standard deviation of the profile parameter $\alpha$ was decreased from 0.1 to 0.015.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of applying glass layers, which may or may not be doped, to the interior of a substrate tube by means of a chemical vapour deposition (CVD) technique, using a reactive gas mixture, in order to obtain a preform that exhibits a precisely defined refractive index profile, the method comprising the following steps:

a) determining the desired refractive index profile of the preform to be manufactured, b) precisely adjusting both the composition and the supply rate of the reactive gas mixture for manufacturing the intended preform, in conformity with the refractive index profile determined in step a), c) introducing the reactive gas mixture, under the conditions adjusted in step b), into the substrate tube and effecting a reaction therein so as to achieve deposition of the glass-forming oxides onto the interior of the substrate tube and maintaining the overall volumetric deposition rate of the glass-forming oxides onto the interior of the substrate tube at a substantially constant level, d) collapsing the substrate tube obtained from the deposition process of step c) into a preform and subsequently subjecting said preform to a refractive index profile measurement, e) comparing the refractive index profile determined in step a) with the refractive index profile measured in step d), and f) correcting the differences in refractive index profiles measured in step e) by adapting the composition of the reactive gas mixture as a function of time during a subsequent deposition process.

2. The method of claim 1, wherein the overall volumetric deposition rate of the glass-forming oxides onto the interior of the substrate tube is maintained at a substantially constant level within a specific refractive index profile range during the deposition process.

3. The method of claim 1, wherein the reactive gas mixture comprises $SiCl_4$ and $O_2$, which reactive gas mixture may or may not contain one or more dopants for increasing or decreasing the refractive index value in comparison with the $SiO_2$ formed from $SiCl_4$ and $O_2$.

4. The method of claim 3, wherein at least one compound consisting of one from among $P_2O_5$, $TiO_2$, $ZrO_2$, $SnO_2$, $GeO_2$, N, and $Al_2O_3$ is used as a dopant for increasing the refractive index value.

5. The method of claim 3, wherein one or more compounds selected from the group consisting of $B_2O_3$ and F are used as dopants for decreasing the refractive index value.

6. The method of claim 1, wherein the deposition of the glass-forming oxides in step c) is carried out by using an internal plasma.

7. The method of claim 1, wherein the deposition of the glass-forming oxides in step c) is carried out by using an external heat source.

8. The method of claim 1, wherein the refractive index profile as determined in step a) changes gradually as a function of the radius of the preform.

9. The method of claim 1, wherein in order to enhance the accuracy of the refractive index profile measurement as carried out in step d), the obtained preform is measured at a number of different longitudinal positions, after which the values thus obtained are averaged.

10. The method of claim 1, wherein the refractive index profile measurement is averaged on the basis of the results of two or more separately manufactured preforms.

* * * * *